(12) United States Patent
Abe

(10) Patent No.: US 9,377,283 B2
(45) Date of Patent: Jun. 28, 2016

(54) METHOD AND PROGRAM FOR USING GESTURES TO CONTROL A COORDINATE MEASURING DEVICE

(71) Applicant: MITUTOYO CORPORATION, Kanagawa (JP)

(72) Inventor: Shinsaku Abe, Hokkaido (JP)

(73) Assignee: MITUTOYO CORPORATION, Kanagawa (JP)

( * ) Notice: Subject to any disclaimer, the term of this patent is extended or adjusted under 35 U.S.C. 154(b) by 264 days.

(21) Appl. No.: 14/147,834

(22) Filed: Jan. 6, 2014

(65) Prior Publication Data
US 2014/0190028 A1 Jul. 10, 2014

(30) Foreign Application Priority Data

Jan. 8, 2013 (JP) ................................ 2013-000891

(51) Int. Cl.
- *G01B 5/00* (2006.01)
- *G01B 5/008* (2006.01)
- *G01B 21/04* (2006.01)

(52) U.S. Cl.
CPC ................ *G01B 5/008* (2013.01); *G01B 21/04* (2013.01)

(58) Field of Classification Search
CPC ........ G01B 11/14; G01B 5/008; G01B 21/04; G01B 11/002; G01B 21/045; G01B 11/005; G01B 11/03; G01B 11/26; G01B 21/047; G01B 2210/58; G01B 5/004; G01B 11/007; G01B 11/2513; G01B 11/2531
USPC .......................................................... 33/503
See application file for complete search history.

(56) References Cited

U.S. PATENT DOCUMENTS

| | | | |
|---|---|---|---|
| 7,197,836 B2 * | 4/2007 | Kikuti .................. | G01B 21/042 33/1 CC |
| 7,804,602 B2 * | 9/2010 | Raab ..................... | G01B 21/04 356/614 |
| 9,109,868 B2 * | 8/2015 | Abe ...................... | G01B 21/047 |
| 2005/0151963 A1* | 7/2005 | Pulla .................... | G01B 21/04 356/139.03 |
| 2011/0107611 A1* | 5/2011 | Desforges ............. | B25J 9/1692 33/502 |
| 2011/0213247 A1* | 9/2011 | Shammas ............ | A61B 8/4218 600/437 |
| 2013/0331986 A1* | 12/2013 | Tait ...................... | G01B 5/008 700/245 |
| 2014/0190027 A1* | 7/2014 | Abe ....................... | G01B 5/008 33/503 |
| 2015/0212915 A1* | 7/2015 | Abe ...................... | G01B 21/047 702/188 |
| 2015/0253125 A1* | 9/2015 | Pettersson ............ | G01B 11/007 715/771 |

FOREIGN PATENT DOCUMENTS

JP 2007-047014 2/2007

OTHER PUBLICATIONS

U.S. Appl. No. 14/102,698 to Shinsaku Abe, filed Dec. 11, 2013.
* cited by examiner

*Primary Examiner* — Yaritza Guadalupe-McCall
(74) *Attorney, Agent, or Firm* — Greenblum & Bernstein, P.L.C.

(57) ABSTRACT

A coordinate measuring device includes a measuring probe measuring three-dimensional coordinates; a measuring arm supporting the measuring probe and outputting position information for calculating the three-dimensional coordinates; a controller connected to the measuring arm and detecting the three-dimensional coordinates based on the position information; and a memory storing a predetermined gesture. The controller further detects a trajectory of the measuring probe based on the continuously detected three-dimensional coordinates and, by cross-checking the trajectory with the gesture stored in the memory, the controller recognizes the specific gesture corresponding to the trajectory.

6 Claims, 6 Drawing Sheets

RELATED ART

RELATED ART

METHOD AND PROGRAM FOR USING GESTURES TO CONTROL A COORDINATE MEASURING DEVICE

CROSS-REFERENCE TO RELATED APPLICATIONS

The present application claims priority under 35 U.S.C. §119 of Japanese Application No. 2013-000891, filed on Jan. 8, 2013, the disclosure of which is expressly incorporated by reference herein in its entirety.

BACKGROUND OF THE INVENTION

1. Field of the Invention

The present invention relates to a coordinate measuring device, and to a method and program for using gestures to control the coordinate measuring device. In particular, the present invention relates to a coordinate measuring device having an articulated arm, and to a method and program for using gestures to control the coordinate measuring device having the articulated arm.

2. Description of Related Art

A coordinate measuring device is known which uses an articulated arm and a measuring probe that allow direct manual movement by a measuring operator to obtain a three-dimensional coordinate value for a desired point on a work piece and perform measurement of a three-dimensional shape, a surface texture, and the like of the work piece.

For example, Japanese Patent Laid-open Publication No. 2007-047014 discloses a coordinate measuring device that includes an articulated arm with a measuring probe retained in a forefront end thereof. The coordinate measuring device has an angle sensor installed at each joint and computes spatial coordinates of a forefront end of the probe based on a rotation angle of each joint detected by the angle sensors and a length between arm joint and arm joint, between arm joint and probe, and the like. An operator places a hand directly on the articulated arm and brings the probe retained in the forefront end of the articulated arm into contact with a surface of a work piece, then measures the work piece.

The coordinate measuring device of this kind is generally connected to a control device such as a PC (Personal Computer) located at a distance from the device. Control software, which runs on the PC, is capable of outputting a plurality of menus to a display device, and can receive an operation by the operator selecting one of the menus, then can execute various functions such as measurement, saving measured data, making various settings, and the like according to the menu selected.

This kind of menu selection operation is required even when the operator is in the midst of executing a measurement. In such a case, the measuring operator must move from a vicinity of the coordinate measuring device to a vicinity of the PC.

In order to address this circumstance, a method (hereafter, an arm menu) can be imagined in which, for example, a menu is displayed large enough to be visible to an operator even from a vicinity of a coordinate measuring device, and in which one among a plurality of menus is displayed highlighted in response to an up-down movement of the arm and the like, and the highlighted menu can be selected in response to operation of a button provided in the vicinity of a probe and the like (see FIG. 5). Thereby, the operator can execute the menu selection operation without moving away from the coordinate measuring device.

However, the following circumstances are present in the above-noted arm menu. First, the menu selection operation cannot be executed during execution of the measurement. This is because the control device cannot distinguish whether a gesture of the arm is an operation for measurement or an operation for menu selection. Thus, in order to perform the menu selection operation, the operator must interrupt execution of the measurement.

In addition, in the above-noted arm menu, when the operator wishes to repeatedly select the same menu in order to repeatedly execute the same function, the same series of menu selection operations must be repeatedly performed. Therefore, time and effort for the menu selection operation increases.

Further, in the above-noted arm menu, the menu is always displayed on a screen at a large size, and thus an area for display of data such as measurement results may be constricted, for example.

In addition, in the above-noted arm menu, in order to select a menu, the arm must be moved up and down. Therefore, selection takes time, or there is a significant physical burden on the operator and, moreover, when moving the arm, there is a possibility that the arm may strike a measurement environment (a person or work piece nearby) or the like and negatively affect safety.

SUMMARY OF THE INVENTION

A feature of the present invention has been devised in order to address the circumstances above, and the present invention provides a coordinate measuring device, and a method and program to control the coordinate measuring device, that improve operability and safety of menu selection.

A coordinate measuring device according to the present invention includes a measuring probe measuring three-dimensional coordinates of a work piece; a measuring arm supporting the measuring probe and outputting position information for calculating the three-dimensional coordinates; a controller connected to the measuring arm and detecting the three-dimensional coordinates based on the position information; and a memory storing a predetermined gesture. The controller further detects a trajectory of the measuring probe based on the continuously detected three-dimensional coordinates and, by cross-checking the trajectory with the gesture stored in the memory, the controller recognizes the specific gesture corresponding to the trajectory.

Another coordinate measuring device according to the present invention includes a measuring probe measuring three-dimensional coordinates of a work piece; a measuring arm supporting the measuring probe and outputting position information for calculating the three-dimensional coordinates; a controller connected to the measuring arm and detecting the three-dimensional coordinates based on the position information; and a memory storing a predetermined gesture. The controller further detects a trajectory of the measuring probe based on the continuously detected three-dimensional coordinates and stores a gesture based on the detected trajectory in the memory.

A method of controlling the coordinate measuring device according to the present invention includes continuously detecting three-dimensional coordinates of a measuring probe and detecting a trajectory of the measuring probe based on the three-dimensional coordinates; and recognizing a specific gesture corresponding to the trajectory by cross-checking the trajectory and a gesture pre-stored in a memory.

Another method of controlling the coordinate measuring device according to the present invention includes continuously detecting three-dimensional coordinates of a measuring probe and detecting a trajectory of the measuring probe based on the three-dimensional coordinates; and storing a gesture based on the detected trajectory in a memory.

A program according to the present invention is a program for executing the above method on a computer.

According to the present invention, a coordinate measuring device, and a method and program to control the coordinate measuring device, can be provided that improve operability and safety of menu selection.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

In order to facilitate understanding of the present invention, a typical configuration of a coordinate measuring device is described before describing embodiments of the present invention.

Figure 6:
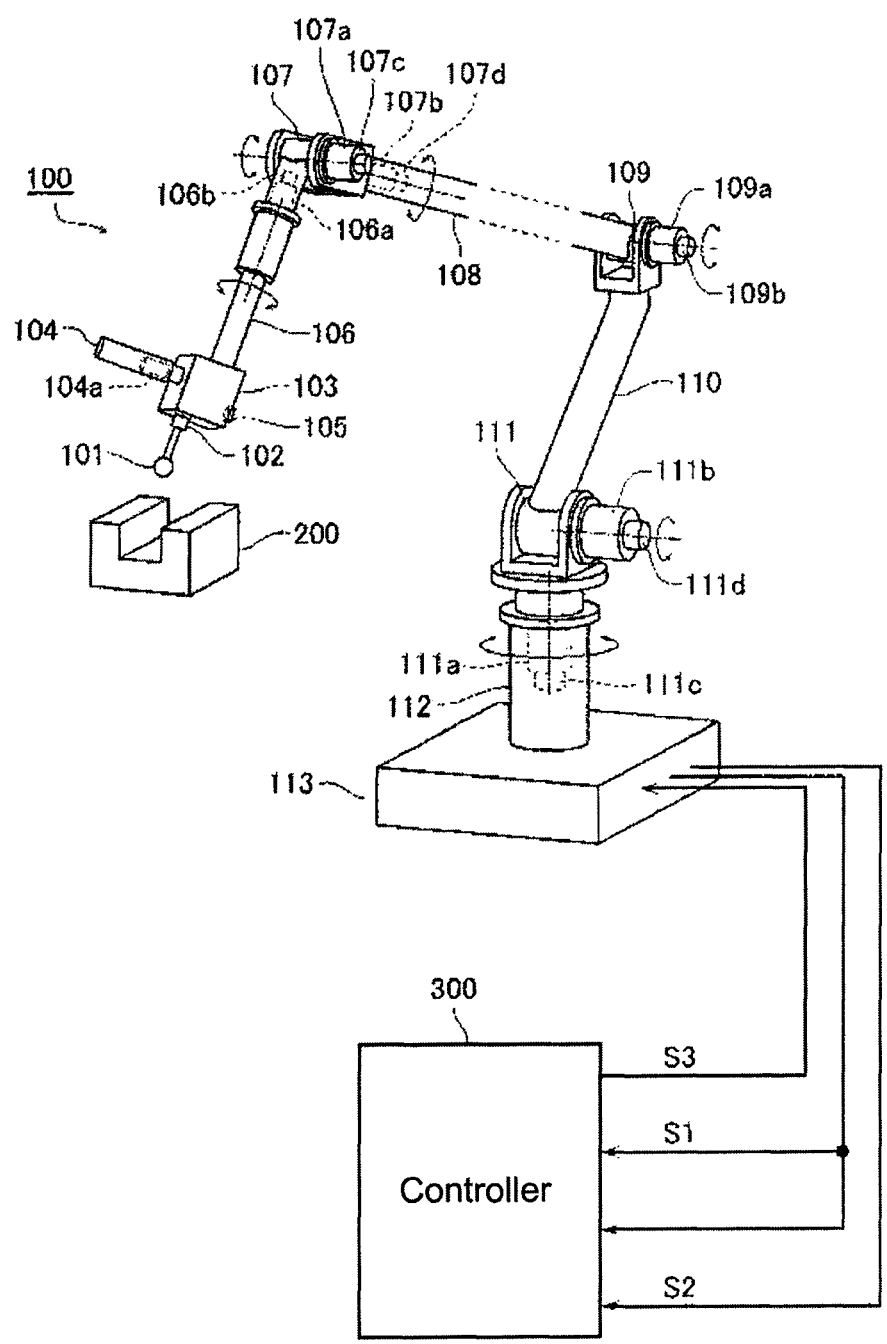
FIG. 6 illustrates a conventional configuration of a coordinate measuring device.

FIG. 6 illustrates a configuration of a coordinate measuring device. The coordinate measuring device includes a measuring probe 101 configured from a contact-type ball probe measuring a work piece 200; a measuring arm 100 supporting the measuring probe 101; and a controller 300 controlling the measuring arm 100 to be in a specific position and orientation.

The measuring arm 100 includes first through third links 106, 108, and 110; a support pillar 112; and first through third joints 107, 109, and 111 connecting these components. The support pillar 112 stands perpendicularly on a base 113 fixated to a work bench and the like. The support pillar 112 is connected to a first end of the third link 110 via the third joint 111. The third joint 111 includes an actuator 111a generating rotational torque with respect to the support pillar 112 within a horizontal plane of the third link 110; an angle sensor 111c detecting a rotation angle of the actuator 111a; an actuator 111b generating rotational torque with respect to the support pillar 112 within a perpendicular plane of the third link 110; and an angle sensor 111d detecting the rotation angle of the actuator 111b. A second end of the third link 110 is connected to a first end of the second link 108 via the second joint 109. The second joint 109 includes an actuator 109a generating rotational torque of the second link 108 with respect to the third link 110 within a plane parallel to a center axis of the third link 110, and an angle sensor 109b detecting the rotation angle of the actuator 109a. Moreover, a second end of the second link 108 is connected to the first link 106 via the first joint 107. The first joint 107 includes an actuator 107b generating rotational torque of the first link 106 with respect to the second link 108, around a center axis of the second link 108; an angle sensor 107d detecting the rotation angle of the actuator 107b; an actuator 107a generating rotational torque of the first link 106 with respect to the second link 108, within a plane parallel to the center axis of the second link 108; and an angle sensor 107c detecting the rotation angle of the actuator 107a. In addition, an actuator 106a generating rotational torque around a center axis of the first link 106 and an angle sensor 106b detecting the angle of the actuator 106a are provided to a portion of the first link 106 connecting to the first joint 107. The measuring arm 100 is thus configured to be operable with six axes.

A probe head 103 is attached to a second end of the first link 106. The probe head 103 includes a handle 104 and a passive measuring button 105 on a side surface, and includes a probe attacher 102 on a forefront end. The measuring probe 101 is attached to the probe head 103 via the probe attacher 102. By gripping the handle 104 to operate, a measuring operator brings the measuring probe 101 into proximity with the work piece 200 from any desired direction, then makes contact with the work piece 200 at any desired angle to conduct a measurement. In addition, the probe attacher 102 is configured such that various probes can be attached. The measuring probe 101 of FIG. 6 brings a forefront end thereof into contact with a surface of the work piece 200 and obtains coordinates of a contact point. However, the measuring probe 101 can be exchanged for a non-contact-type probe, for example, such as an imaging probe using a CCD camera or image sensor, or a laser scanning-type laser probe. Furthermore, rotation axes are not limited to the six as shown in FIG. 6. Joints with five or fewer axes, or seven or more axes, may be provided instead. Also, the measuring probe 101 may be a copying probe continuously measuring contour shape data of a measured surface.

An angle detection signal S1 is output from the measuring arm 100, the angle detection signal S1 serving as position information indicating a relative angle of each of the joints 107, 109, and 111, which is detected by the angle sensors 106b, 107d, and so on. A controller 300 inputs the detection signal S1, then calculates the coordinates of the contact point between the probe 101 and the work piece 200 using a method described in Japanese Patent Laid-open Publication No. 2007-047014, for example.

Figure 1:
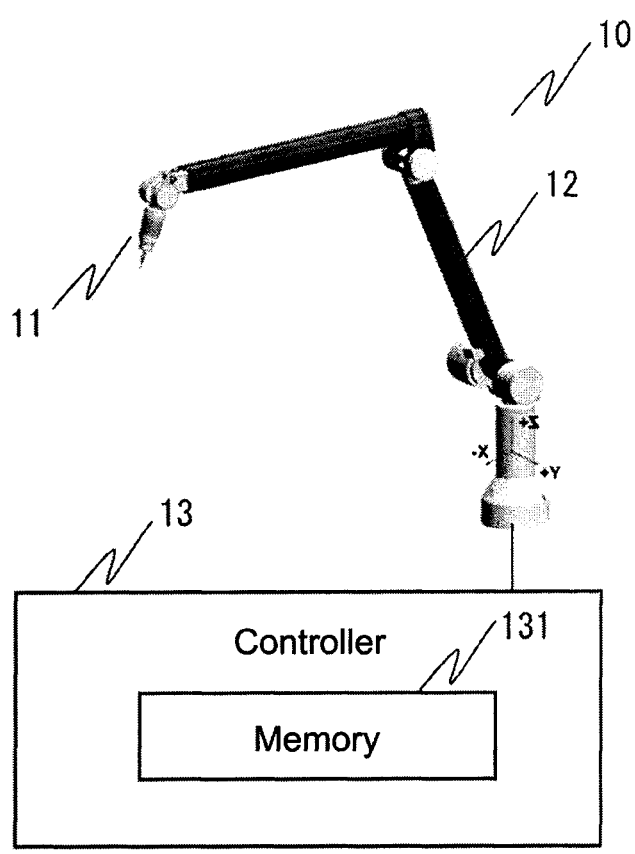
FIG. 1 illustrates a configuration of a coordinate measuring device according to a first embodiment.

Hereafter, based on such a coordinate measuring device, an embodiment of the present invention is described with reference to the drawings. FIG. 1 illustrates a configuration of a coordinate measuring device 10 according to the embodiments of the present invention.

The coordinate measuring device 10 includes a measuring probe 11 for measuring a work piece; a measuring arm 12 supporting the measuring probe 11 such that the measuring probe 11 is capable of displacement in response to an external force, the measuring arm 12 also outputting position information for the measuring probe 11; and a controller 13 inputting the position information and calculating three-dimensional coordinates of the measuring probe 11.

The controller 13 includes a memory 131. The memory 131 stores a gesture list, a command list, and an assigned gesture list. The assigned gesture list is a list configured from at least one record creating a desired association between a predetermined gesture (in other words, trajectory information for the measuring probe 11) and a predetermined command. The gesture list and the command list are lists for storing, in advance, gestures and commands capable of being registered in the assigned gesture list.

Moreover, the controller 13 may further include a display for outputting a display of a menu and the three-dimensional coordinates (measurement results), and an inputter (e.g., a pointing device, a keyboard, etc.) for receiving an instruction or input from an operator.

Figure 3:
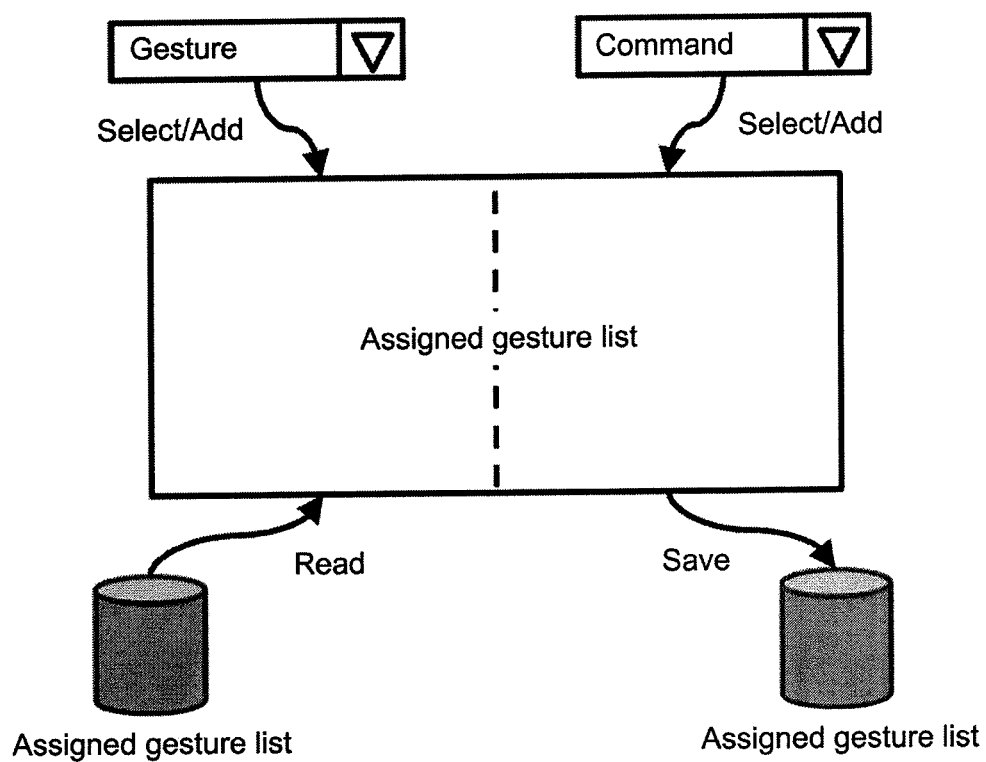
FIG. 3 illustrates a process of the coordinate measuring device according to the first embodiment.
Figure 4:
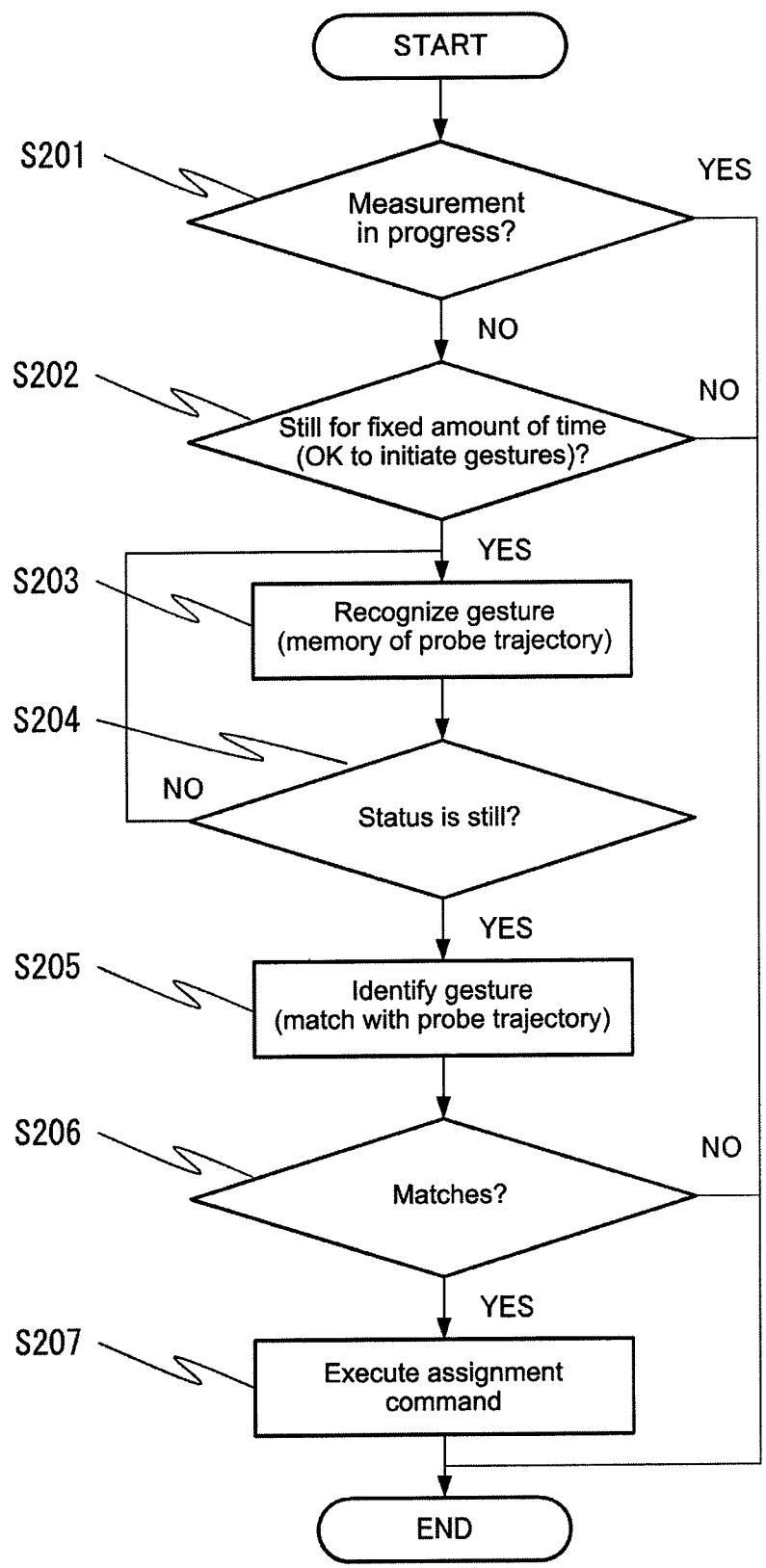
FIG. 4 illustrates a process of the coordinate measuring device according to the first embodiment.
Figure 5:
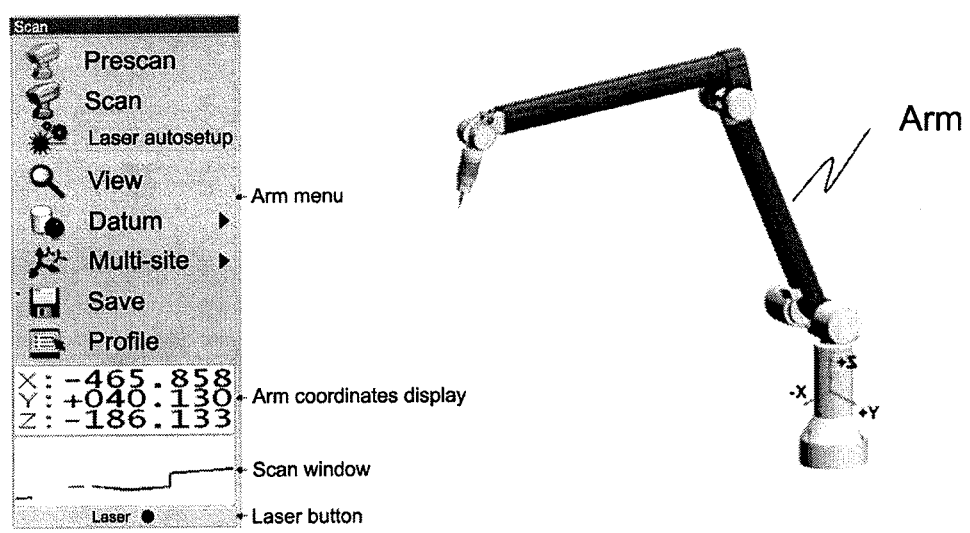
FIG. 5 illustrates a conventional method for menu selection.

Next, gestures of the coordinate measuring device 10 are described with reference to FIGS. 2-4.

(Registering a Gesture)

Figure 2:
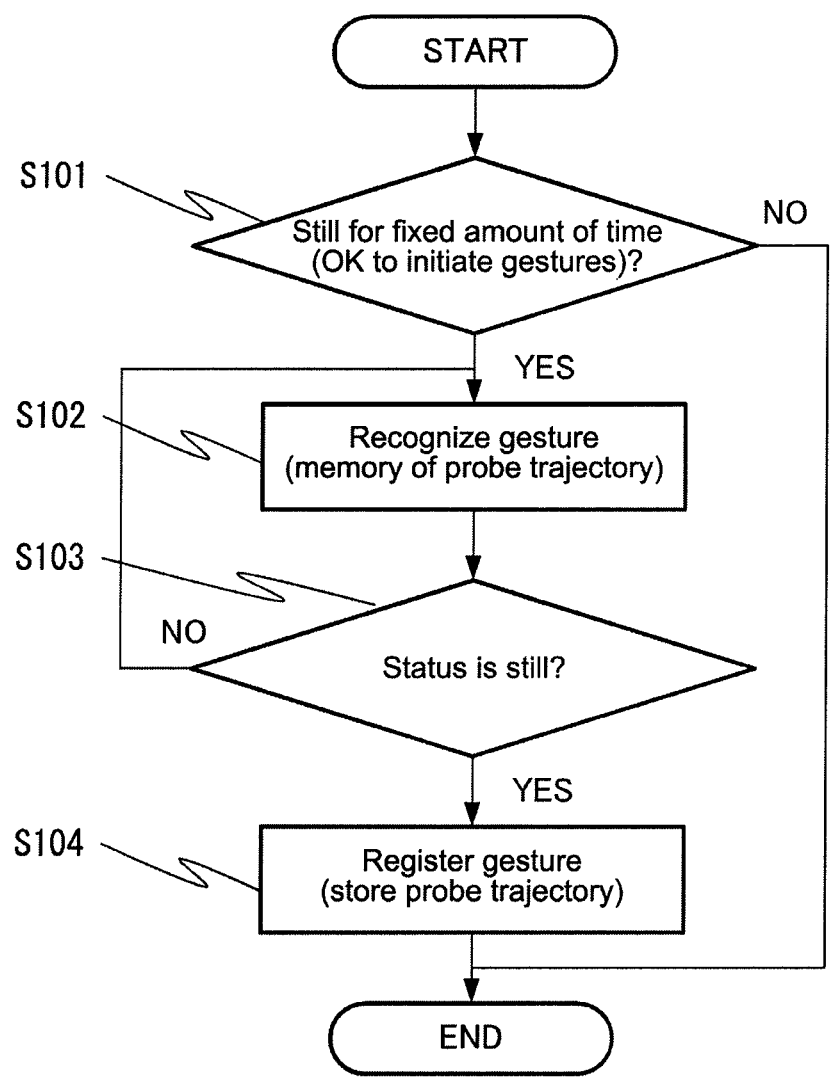
FIG. 2 illustrates a process of the coordinate measuring device according to the first embodiment.

FIG. 2 is a flowchart of a process for registering a gesture in the gesture list.

S101: The controller 13 continuously detects coordinates of the measuring probe 11. For example, the controller 13 can continuously perform detection for every fixed amount of time t. Herein, when displacement of the coordinates of the measuring probe 11 stays within a predetermined threshold value for an amount of time T longer than t, the controller 13 determines that the measuring probe 11 has become still. When the measuring probe 11 has become still, the controller 13 treats this as the operator stopping a measurement operation and initiates a gesture registration process.

Furthermore, in addition to the above determination, the gesture registration process may also be initiated by detecting operation of an inputter (not shown in the drawings) provided in a vicinity of the measuring probe 11 (e.g., a button, a switch, and the like) or of an inputter provided to the controller 13, by inputting a command with a gesture (a specific method is noted below), and the like.

S102 to S103: The controller 13 detects a gesture to be registered in the gesture list. By continuously detecting the coordinates of the measuring probe 11 for every fixed amount of time t, for example, the controller 13 obtains a set of time-series coordinates (S102), then, when the measuring probe 11 becomes still, the controller 13 stops obtaining coordinates (S103). Herein, determination that the measuring probe 11 is still can be performed with a method similar to that of step S101. In addition, obtaining coordinates may be stopped by detection of an operation of an inputter (not shown in the drawings), by inputting a command with a gesture, and the like.

The controller 13 detects a gesture based on the obtained set of coordinates. For example, the trajectory obtained by linking the set of coordinates in a time series can be detected as a gesture. Alternatively, the trajectory may be obtained after performing sampling with desired criteria, performing coordinate substitution, and the like on the set of coordinates. Moreover, detecting the gesture from the set of coordinates may be achieved using other commonly used methods.

S104: The controller 13 registers the gesture detected in step S102 in the gesture list in the memory 131. Moreover, in addition to containing the gesture recognized by the process illustrated in FIG. 2, the gesture list may also contain, in advance, a typical gesture. For example, the gesture list can contain, in advance and as initial values, a circle, a square, a triangle, an up-down-direction swing, a horizontal-direction (left-right or front-back) swing, and the like.

(Assigning Commands to Gestures)

A process of assigning a command to a gesture is described with reference to FIG. 3. First, the controller 13 displays, on a display, a list 31 and a list 32, the list 31 showing it one view the gestures registered in the gesture list and the list 32 showing in one view the commands preregistered in the command list. Herein, various commands involved in operating the coordinate measuring device 10 are preregistered in the command list.

In addition, when a record is already present in the assigned gesture list, the controller 13 may retrieve the record and display the record in a list 33 in a manner enabling the operator to recognize the correspondence between the gesture and the command.

Using the inputter, the operator selects one gesture from the list 31 and selects a command to be associated with the gesture from the list 32. When this input is received, the controller 13 can display the selected gesture and command on the list 33 in a manner enabling the operator to recognize the correspondence between the two. In addition, the controller 13 adds and saves the gesture and command associated by the operator to the assigned gesture list.

(Menu Execution with Gestures)

A menu execution process using gestures is described with reference to FIG. 4. S201: The controller 13 determines whether the measuring probe 11 is currently being used for measurement. For example, when a measurement menu is being executed in the controller 13, the controller 13 determines that the measuring probe 11 is currently being used for measurement.

S202: When the measuring probe 11 is not currently being used for measurement, the controller 13 determines whether the measuring probe 11 is still. Herein, the controller 13 can make a determination in a manner similar to that of step S101, described above. When the measuring probe 11 is still, the controller 13 initiates the menu execution process using gestures. In other words, the controller 13 stands by to detect a gesture.

Moreover, in addition to the above determination, the menu execution process using gestures may also be initiated by, for example, detecting operation of an inputter (e.g., a button, a switch, and the like; not shown in the drawings) provided in the vicinity of the measuring probe 11.

S203 to S204: The controller 13 detects a gesture. By detecting the coordinates of the measuring probe 11 for every fixed amount of time t, the controller 13 obtains the set of time-series coordinates (S203), then stops obtaining coordinates when the measuring probe 11 becomes still (S204). Herein, determination that the measuring probe 11 is still can be performed with a method similar to that of step S101. In addition, obtaining coordinates may be stopped by detection of an operation of an inputter (not shown in the drawings), by inputting a command with a gesture, and the like. In addition, the controller 13 detects a gesture based on the obtained set of coordinates. Detection of the gesture can be performed with a method similar to that of steps S102 to S103, described above.

S205 to S206: The controller 13 performs matching (cross-checking) of the gesture detected in S203 to S204 and the gestures stored in the gesture list in the memory 131 (S205) in order to recognize the gesture (S206). For example, the controller 13 compares the detected gesture and all gestures stored in the gesture list, and can then recognize the gesture in the gesture list whose trajectory matches that of the detected gesture or whose trajectory has the highest degree of similarity to that of the detected gesture as the input gesture. Herein, cross-checking of the trajectory and, typically, determination of a match or degree of similarity can be achieved with various commonly used methods.

S207: The controller 13 references the assigned gesture list in the memory 131, then identifies the command associated with the gesture recognized in S205. Then, the controller 13 executes the identified command.

For example, content of the assigned gesture list may resemble the following example.

| Gesture: | Command: |
| --- | --- |
| Swing probe in up-down direction | Run measurement menu |
| Swing probe in horizontal direction (left-right) | Run settings menu |
| Trace circle (○) with probe | Run gesture registration process |
| Trace square (□) with probe | Execute command A |
| Trace triangle (△) with probe | Execute command B |
| Trace cross (X) with probe | Execute command C |

In this example, when the gesture of "swing probe in up-down direction" is recognized by the processes of steps S201 through S205, the controller 13 executes the command "run measurement menu" associated with the gesture. Further, when the gesture of "trace circle (○) with probe" is recognized, the controller 13 executes the command "run gesture registration process."

According to the present embodiment, simply by moving the measuring probe 11, which is the forefront axis of the measuring arm 12, (performing a gesture) a desired command can be executed. Further, because the desired gesture and command are associated, a command that is used often can be executed with a gesture that is readily performed by an operator. Moreover, there is no need to display a conventional arm menu on a display, and thus more of a screen of the display can be used for more important purposes, such as displaying measurement results. In addition, there is no need for the operator to approach the controller 13 and select a menu, so work time can be reduced. In this way, operability of the coordinate measuring device 10, which was a conventional concern, can be greatly improved.

According to the present embodiment, operation of the menu requires only a gesture operation of the measuring probe 11, which is the forefront axis of the measuring arm 12. Such an operation is a much smaller movement than in the conventional arm menu, and so accidents such as the measuring arm 12 striking a work piece or a person can be reduced. In this way, safety of the coordinate measuring device 10, which was a conventional concern, can be greatly improved.

According to the present embodiment, a desired command can be directly executed using a specific gesture. In the conventional arm menu and the like, menu selection occurs in a restricted screen area, and thus hierarchical menus are typically used, requiring the operator to navigate a large number of tiers before selecting a desired menu. However, in the present embodiment, there is no need for such hierarchical menu selection. Instead, the desired command can be directly executed using a specific gesture, and thus usability can be improved and measurement time can be compressed.

According to the present embodiment, the assigned gesture list can be shared with a plurality of operators, and thus usability can be improved and measurement time can be compressed. In addition, by sharing the assigned gesture list in the memory 131 with a plurality of coordinate measuring devices 10, a command that is used often can be executed on the plurality of coordinate measurement devices 10 with a gesture that is readily performed by an operator.

The present invention is not limited to the embodiments above and can be modified as needed without departing from the scope of the invention. For example, in the above-noted embodiments, the controller 13 is described as a hardware configuration. However, the present invention is not limited to this, and desired processes can also be achieved by executing a computer program in a CPU (Central Processing Unit). In such a case, the computer program can be stored using various types of non-transitory computer-readable media and can be supplied to a computer. Non-transitory computer-readable media include various types of tangible storage media. Examples of non-transitory computer-readable media include a magnetic storage medium (for example, a flexible disk, a magnetic tape, and a hard disk drive); a magnetooptical storage medium (for example, a magnetooptical disk); a CD-ROM (Read Only Memory); a CD-R; a CD-R/W; and a semiconductor memory (for example, a mask ROM, PROM (Programmable ROM), EPROM (Erasable PROM), flash ROM, and RAM (Random Access Memory)). In addition, the program may be supplied to the computer by various types of transitory computer readable media. Examples of transitory computer readable media include an electric signal, an optical signal, and an electromagnetic wave. Transitory computer readable media can supply the program to the computer via a wired communication channel such as electric wires and optical fibers, or via a wireless communication channel.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A coordinate measuring device that measures a work piece comprising:
    a measuring probe configured to measure three-dimensional coordinates;
    a measuring arm configured to support the measuring probe, and further configured to output position information for calculating the three-dimensional coordinates;
    a controller connected to the measuring arm and configured to detect the three-dimensional coordinates based on the position information; and
    a memory configured to store a list of a predetermined gesture and a predetermined command associated with each other,
    wherein the controller is further configured to:
        determine whether the measuring probe is currently being used for measuring the work piece,
        detect a trajectory of movement of the measuring probe based on the continuously detected three-dimensional coordinates, when it is determined that the measuring probe is not currently being used for measuring the work piece,
        recognize a gesture corresponding to the trajectory detected based on the continuously detected three-dimensional coordinates, by cross-checking the detected trajectory with the predetermined gesture stored in the memory, when it is determined that the measuring probe is not currently being used for measuring the work piece, and reference the list stored in the memory to identify and execute a command associated with the recognized gesture in the list.

2. A coordinate measuring device that measures a work piece comprising:

a measuring probe configured to measure three-dimensional coordinates;

a measuring arm configured to support the measuring probe, and further configured to output position information for calculating the three-dimensional coordinates;

a controller connected to the measuring arm and configured to detect the three-dimensional coordinates based on the position information; and a memory configured to store a list of a predetermined gesture and a predetermined command associated with each other, wherein the controller is further configured to:

determine whether the measuring probe is currently being used for measuring the work piece, detect a trajectory of movement of the measuring probe based on continuously detected three-dimensional coordinates, when it is determined that the measuring probe is not currently being used for measuring the work piece, and create an association between a gesture, corresponding to the detected trajectory, and the predetermined command, when it is determined that the measuring probe is not currently being used for measuring the work piece, and store the gesture corresponding to the detected trajectory and the predetermined command associated with each other in the list in the memory, when it is determined that the measuring probe is not currently being used for measuring the work piece.

3. A method of controlling a coordinate measuring device that measures a work piece, the method comprising:

pre-storing, in a memory, a list associating a predetermined gesture and a predetermined command;

determining whether the measuring probe is currently being used for measuring the work piece;

continuously detecting three-dimensional coordinates of a measuring probe and detecting a trajectory of movement of the measuring probe based on the continuously detected three-dimensional coordinates, when it is determined that the measuring probe is not currently being used for measuring the work piece;

recognizing a gesture corresponding to the trajectory detected based on the continuously detected three-dimensional coordinates, by cross-checking the detected trajectory with the predetermined gesture pre-stored in a memory, when it is determined that the measuring probe is not currently being used for measuring the work piece, referencing the list to identify a command associated with the recognized gesture; and executing the identified command.

4. At least one non-transitory computer readable medium storing a program for executing the method according to claim 3 on a computer.

5. A method of controlling a coordinate measuring device that measures a work piece, the method comprising:

determining whether the measuring probe is currently being used for measuring the work piece;

continuously detecting three-dimensional coordinates of a measuring probe and detecting a trajectory of movement of the measuring probe based on the continuously detected three-dimensional coordinates, when it is determined that the measuring probe is not currently being used for measuring the work piece;

creating an association between a gesture, corresponding to the detected trajectory, and the predetermined command, when it is determined that the measuring probe is not currently being used for measuring the work piece;

storing the gesture corresponding to the detected trajectory and the predetermined command associated with each other in a list in a memory, when it is determined that the measuring probe is not currently being used for measuring the work piece.

6. At least one non-transitory computer readable medium storing a program for executing the method according to claim 5 on a computer.

* * * * *